3,275,520
METHODS FOR PROTECTING THE SKIN AGAINST
ACTINIC RADIATIONS
Albert F. Strobel, Delmar, and Sigmund C. Catino, Castleton, N.Y., and Marvin R. Leibowitz, Edison, N.J., assignors to General Aniline & Film Corporation, New York, N.Y., a corporation of Delaware
No Drawing. Filed May 29, 1962, Ser. No. 198,448
10 Claims. (Cl. 167—90)

This invention relates to new and useful compositions and in particular to those compositions which are applied to the human skin, as for example, cosmetics, shaving lotions and creams, suntan lotions and the like which are characterized as having superior resistance to degradation and deterioration when exposed to actinic radiation such as sunlight, and which in addition afford outstanding protection to the skin against the effects of sunlight including sunburning, wrinkling, and aging due to the actinic radiations.

The compounds which are herein contemplated have the following general formula:

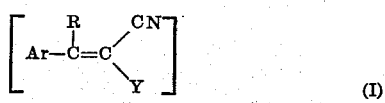
(I)

R=hydrogen, alkyl, aryl, alkenyl, hetero or substituted forms thereof,
Y=CN, COX,

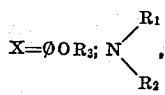

$R_1$, $R_2$ and $R_3$=H, alkyl, aryl, substituted alkyl, etc.,
Ar represents an aromatic carbocyclic nucleus or a heterocyclic nucleus having aromaticity, i.e., at least one pair of conjugated double bonds.

Suitable R, $R_1$, $R_2$ and $R_3$ substituents include the following:

alkyl—
    methyl
    ethyl
    n-propyl
    iso-propyl
    n-butyl
    iso-butyl
    tertiary-butyl
    secondary-butyl
    n-amyl
    iso-amyl
    tertiary-amyl and the other isomeric amyls
    n-hexyl
    iso-hexyl and the other isomeric hexyls
    n-heptyl
    iso-heptyl and the other isomeric heptyls
    n-primary nonyl (nonyl-1)
    nonyl-(2)
    nonyl-(3)
    nonyl-(5)
    2-methyl-octyl-2
    4-ethyl-heptyl-4
    2-methyl-4-ethyl-hexyl-4
    n-primaryl octyl, octyl-(2) (capryl)
    2-methyl-3-ethyl-pentyl-3
    2,2,4-trimethyl-pentyl-4
    2-ethyl-hexyl-1
    3-ethyl-hexyl-3
    2-methyl-heptyl-2
    3-methyl-heptyl-3
    4-methyl-heptyl-4
    n-primary decyl (decyl-1)
    decyl-4 (secondary decyl)
    2-ethyl-octyl-3 (tertiary decyl)
    4-propyl-heptyl-4 (tertiary decyl)
    undecyl-1 (n-primary decyl)
    undecyl-2 (n-secondary decyl)
    dodecyl-1 (n-dodecyl)
    tridecyl-1 (n-tridecyl)
    tridecyl-7
    3-ethyl-undecyl
    tetradecyl-1 (n-tetradecyl)
    pentadecyl-1 (n-pentadecyl)
    pentadecyl-8
    hexadecyl (cotyl)
    heptadecyl-9
    octadecyl-1
    2-methyl heptadecyl-2
    eicosyl-1
    docosyl-1
    tricosyl-12
    tetracosyl
    tricapryl
    pentacosyl
    hexacosyl
    heptacosyl
    octacosyl
    nonacosyl
    myricyl (30 carbons)
alkenyl—
    allyl ($CH_2$=$CHCH_2$—)
    methallyl ($CH_2$=$C(CH_2)CH_2$—)
    crotyl ($CH_3CH$=$CHCHCH_2$—)
    pentenyl-1
    γ-isopropyl allyl
    β-ethyl-γ-propyl allyl
    2-methyl-octenyl-6
    decenyl-1
    decenyl-2
    undecenyl
    dodecenyl-2
    octadecenyl
    docosenyl
    pentamethyl eicosenyl
substituted alkyl—
    cyanoethyl
    cyano-n-propyl
    cyano-isopropyl
    cyano-n-butyl
    cyano-isobutyl
    cyano-n-amyl
    cyano-isoamyl
    cyanohexyl
    cyanoheptyl
    cyano-n-octyl
    cyano-nonyl
    cyanodecyl
    cyanolauryl
    cyanostearyl and the like
    hydroxyethyl
    hydroxy-n-propyl
    hydroxy-isopropyl
    hydroxy-n-butyl
    hydroxy-isobutyl
    hydroxy-n-amyl
    hydroxy-isoamyl
    hydroxy-hexyl
    hydroxy-heptyl
    hydroxy-nonyl
    hydroxy-decyl
    hydroxy-lauryl
    hydroxy-stearyl, and the like
    carbomethoxyethyl carbomethoxypropyl
carbomethoxybutyl
carbomethoxyamyl
carbomethoxyhexyl
carbethoxyethyl
carbethoxypropyl
carbethoxybutyl, etc.
carbopropoxyethyl
carbopropoxypropyl
carbopropoxybutyl, etc.
carbobutoxyethyl
carbobutoxybutyl, etc.
chloroethyl
chloropropyl (N-propyl, isopropyl)
chlorobutyl (N-butyl, isobutyl, etc.)
chloroamyl
chlorohexyl
chlorodecyl
chlorolauryl, and the like
bromoethyl
bromopropyl (N-propyl, isopropyl)
bromobutyl (N-butyl, isobutyl, etc.)
bromoamyl
bromohexyl
bromodecyl
bromolauryl, and the like
methoxyethyl
methoxypropyl (N-propyl, isopropyl)
methoxybutyl (N-butyl, isobutyl, etc.)
methoxyamyl
methoxyhexyl
methoxydecyl
methoxylauryl, and the like
ethoxyethyl
ethoxypropyl (N-propyl, isopropyl)
ethoxybutyl (N-butyl, isobutyl, etc.)
ethoxyamyl
ethoxyhexyl
ethoxydecyl
ethoxylauryl, and the like
hydroxyethoxyethyl
hydroxyethoxypropyl
hydroxyethoxybutyl
hydroxyethoxyamyl
hydroxypropoxyethyl
hydroxypropoxypropyl
hydroxypropoxybutyl
hydroxypropoxyamyl
hydroxybutoxyethyl
hydroxybutoxypropyl
hydroxybutoxybutyl
hydroxybutoxyamyl aryl—
  phenyl
  tolyl
  xylyl
  cumyl
  $\alpha$-naphthyl
  $\beta$-naphthyl
  $\alpha$-anthraquinonyl
  $\beta$-anthraquinonyl
  $\gamma$-anthraquinonly
  phenanthranyl
  diphenyl and the alkaline substituted derivatives thereof substituted aryls, e.g.—
  anisole
  penetole
  p-diethoxyphenyl
  1-methoxy phenanthryl
  $\alpha$-naphthylmethylether
  $\beta$-naphthylmethylether
  $\alpha$-naphthylethylether
  $\beta$-naphthylethylether
  hydroxyethyl phenyl
  hydroxypropyl phenyl
  chlorophenyl
  bromophenyl
  1,2-dichlorophenyl
  1,3-dichlorophenyl
  1,3,5-trichlorophenyl
  1,2-dibromophenyl
  $\alpha$-chlorotolyl
  m-chlorotolyl
  m-bromotolyl
  bromo-o-xylyl
  $\alpha,\beta$-dichloronaphthyl
  4-bromoacenaphthyl
  carboxyphenyl
  carboxytolyls
  carboxyxylyls
  carbalyoxylphenyls, e.g., carbomethoxylphenyl, carboethoxyphenyl
  carbalkoxytolyls, e.g., carbomethoxytolyls
  acetophenyl
  propiophenyl
  butyrophenyl
  lauroylphenyl
  stearoylphenyl
  p-acetotolyl
  o-acetotolyl
  $\alpha$-benzoyl naphthyl
  $\beta$-benzoyl naphthyl
  acetaminophenyl
  acet-methylamino phenyl
  o-acetoaminotolyl
  p-acetoaminotolyl
  $\alpha$-acetoaminonaphthyl
  $\beta$-acetoaminonaphthyl
  propio-aminophenyl
  butyro-aminophenyl
  o-propio-aminotolyl
  p-propio-aminotolyl
  o-butyroaminotolyl
  p-butyroaminotolyl
  o-lauroylaminotolyl
  p-lauroylaminotolyl
  o-stearoylaminotolyl
  o-stearoylaminotolyl
  sulfamyl phenyl
  sulfamyl naphthyl alkaryls, e.g.—
  benzyl
  phenethyl
  phenyl n-propyl
  phenyl iso-propyl
  phenyl iso-butyl
  2,4-dimethyl benzyl
  2-methyl benzyl
  4-methyl benzyl, and the like heterocyclics—
  thiophene
  furane
  pyrrole
  $\alpha$-pyrane
  $\gamma$-pyrane
  pyridine
  1,2-dehydropyridine
  oxazole
  thiazole
  isoxazole
  isothiazole
  pyrazole
  3-isopyrazole
  imidazole
  1,2,3-triazole
  1,2,4-triazole
  tetrazole
  1,3,4-oxadiazole
  1,2,5-oxadiazole
  1,2,3-thiadiazole 1,2,3-oxathiazole
pyridazine
pyrimidine
pyrazine
1,3,5-triazine and fused ring systems of benzene with the aforementioned heterocyclics, e.g., benzothiophene
benzofurane
quinoline
phthalazine
benzimidazole
1,2,3-benztriazole
benzoxazole The aryl and hetero nuclei described above may also contain any of the alkyl, substituted alkyl, aryl and substituted aryl radicals mentioned as suitable of the various R substituents, and also may contain:

halogen
acyl
sulfonyl
carboxamido
oxy, etc., substituents which may vary the ultra-violet absorption spectrum but which do not affect the function, utility and stability of the compounds. Specific examples of such substituents are:

| | |
|---|---|
| fluorine | o-toluoyl |
| chlorine | m-toluoyl |
| bromine | p-toluoyl |
| iodine | 4-chloro-p-toluoyl |
| acetyl | 2,5-dichloro-p-toluoyl |
| propionyl | 2-methoxy-benzoyl |
| butanoyl | 3-methoxy-benzoyl |
| amoyl | 4-methoxy-benzoyl |
| octoyl | 2-acetoxy-benzoyl |
| lauroyl | carbomethoxy salicyloyl |
| stearoyl | methyl sulfonyl |
| oleoyl | ethyl sulfonyl |
| benzoyl | phenethyl sulfonyl |
| o-, m- and p-toluoyl | phenyl sulfonyl |
| naphthoyl | o-chlorophenyl sulfonyl |
| 1-chlorobenzoyl | p-chlorophenyl sulfonyl |
| 2-chlorobenzoyl | o-tolyl sulfonyl |
| p-chlorobenzoyl | p-tolyl sulfonyl |
| o-methylsulfonylbenzoyl | hydroxy |
| p-methylsufonylbenzoyl | methoxy |
| o-hydroxyethylbenzoyl | ethoxy |
| p-hydroxyethylbenzoyl | carboxamido |
| 2,4-dichlorobenzoyl | N-methylcarboxamide |
| 2,5-dichlorobenzoyl | N-ethylcarboxamide |
| 2,6-dichlorobenzoyl | N,N-diethylcarboxamide |
| 3-chloro-2-bromobenzoyl | N,N-dimethylcarboxamide |
| 4-chloro-2-bromobenzoyl | | and the like.

In addition to compounds of Formula I, when Y=COX, the compounds may be doublets of the general formula:

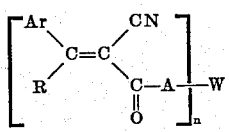

wherein A=—O— or —NR and wherein n=1 or 2; when n=1 we have compounds of Formula I; when n=2 and R is as in Formula I. W is a bivalent bridging radical. Suitable W radicals include:

—CH₂CH₂—
—CH₂CH₂CH₂—
—CH₂CH₂CH₂CH₂—
—CH₂CH₂CH₂CH₂CH₂—

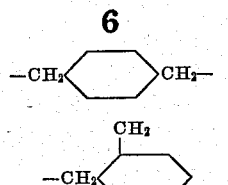
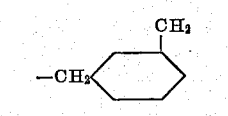
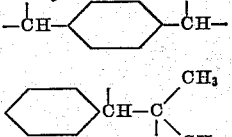
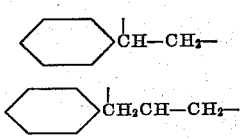
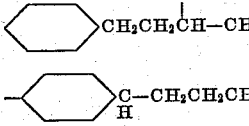
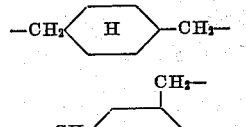
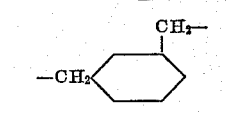
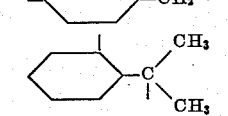
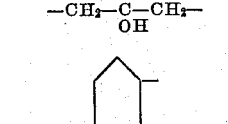
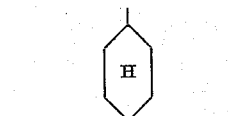
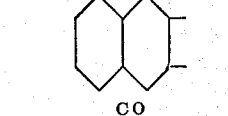
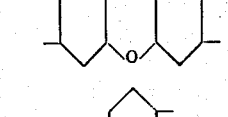
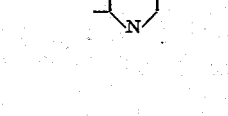
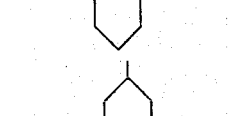
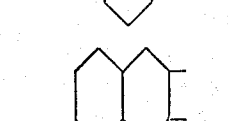
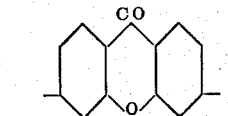
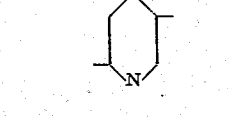

It is of course clear that other non-chromophoric substituents may be present in the above radicals, e.g., —CHClCHCl—
—CHBrCH₂CHBr—

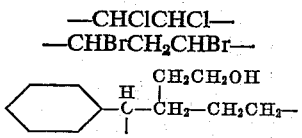

and the like.

In addition to the above contemplated derivatives, polyoxyalkylated derivatives thereof are within the purview of this invention. Any of the aforementioned derivatives containing at least one reactive hydrogen atom may be reacted with an alkylene oxide or a compound functioning as an oxide such as ethylene oxide, propylene oxide, butylene oxide, butylene dioxide, cyclohexane oxide, glycidol, epichlorohydrin, butadiene dioxide, isobutylene oxide, styrene oxide and mixtures thereof, and the like to yield the corresponding polyoxyalkylated product. Such reactive compounds include hydroxy compounds (phenols, alcohols), amides, sulfonamides and the like. From one to about 100 moles of oxyalkylating agent may be added to the compounds.

The general procedure for the preparation of the compounds employed in this invention involves a condensation of a keto compound (aldehyde or ketone) with a cyanomethylene compound of the general type:

CNCH₂CY wherein Y is as defined in Formula I.

The preferred keto compounds are ketones and as illustrative thereof are:

2-methylbenzophenone
3-methylbenzophenone
4-methylbenzophenone
2-chlorobenzophenone
3-chlorobenzophenone
4-chlorobenzophenone
2-bromobenzophenone
3-bromobenzophenone
4-bromobenzophenone
2-iodobenzophenone
3-iodobenzophenone
4-iodobenzophenone
4-fluorobenzophenone
4-cyanobenzophenone
benzophenonecarboxylic acid-(2)
benzophenonecarboxylic acid-(3)
benzophenonecarboxylic acid-(4)
2-benzoylbenzoic acid methyl ester
2-benzoylbenzoic acid ethyl ester
2-benzoylbenzoic acid amide
2-benzoylbenzoic acid monoethyl amide
3-benzoylbenzoic acid methyl ester
3-benzoylbenzoic acid ethyl ester
4-benzoylbenzoic acid methyl ester
4-benzoylbenzoic acid ethyl ester
4-sulfonamidebenzophenone
2-sulfonamidebenzophenone
4-ethylbenzophenone
2,4-dimethylbenzophenone
2,5-dimethylbenzophenone
3,4-dimethylbenzophenone
2,4′-dimethylbenzophenone
3,4′-dimethylbenzophenone
3,4′-dimethylbenzophenone
4-propylbenzophenone
4-isopropylbenzophenone
2,4,5-trimethylbenzophenone
2,4,6-trimethylbenzophenone
2,4,2′-trimethylbenzophenone
2,4,3′-trimethylbenzophenone
2-methyl-5-isopropylbenzophenone
2,3,4,6-tetramethylbenzophenone
2,3,5,6-tetramethylbenzophenone 2,4,2′,4′-tetramethylbenzophenone
2,5,2′,5′-tetramethylbenzophenone
2,4,3′,4′-tetramethylbenzophenone
2,4,6,3′,5′-pentamethylbenzophenone
2,2′-dimethyl-5,5′-di-isopropylbenzophenone
4-n-octylbenzophenone
4-cyclobenzylbenzophenone
2-benzoylbenzophenone
4,4′-dicyclohexylbenzophenone
4,4′-di-p-toluylbenzophenone
2-phenylbenzophenone
3-phenylbenzophenone
4-phenylbenzophenone
2-propenylbenzophenone
2-allylbenzophenone
N,N-dimethyl-2-sulfonamidebenzophenone
4-phenethylbenzophenone
2-carboxamidobenzophenone
2-hydroxybenzophenone
3-hydroxybenzophenone
4-hydroxybenzophenone
2-methoxybenzophenone
3-methoxybenzophenone
4-methoxybenzophenone
2-ethoxybenzophenone
3-ethoxybenzophenone
4-ethoxybenzophenone
2-phenoxybenzophenone
3-phenoxybenzophenone
4-phenoxybenzophenone
4-xylyloxybenzophenone
4-(m-tolyloxy)benzophenone
4-(p-tolyloxy)benzophenone
4-isopentyloxybenzophenone
2-acetoxybenzophenone
3-acetoxybenzophenone
4-acetoxybenzophenone
4-cyclohexyloxybenzophenone
4-benzyloxybenzophenone
2,4′-difluorobenzophenone
4,4′-difluorobenzophenone
2,4-dibromobenzophenone
2,6-dibromobenzophenone
2,4′-difluorobenzophenone
2,2′-dibromobenzophenone
2,4′-dibromobenzophenone
3,3′-dibromobenzophenone
4,4′-dibromobenzophenone
4,4′-dichlorobenzophenone
2,4-dichlorobenzophenone
2,4′-dichlorobenzophenone
3,4-dichlorobenzophenone
4,4′-di-iodobenzophenone
3,5-di-iodobenzophenone
4-chloro-4′-bromobenzophenone
2,2′-di-iodobenzophenone
2,4-dichloro-2′,4′-dibromobenzophenone
2,4,6-tribumobenzophenone
2,4,6-trichlorobenzophenone
2,5,2′,5′-tetrachlorobenzophenone
2,4,2′,4′-tetrachlorobenzophenone
2-bromo-4′-phenylbenzophenone
2-chloro-4′-phenylbenzophenone
2-bromo-2′,4,4′,6,6′-pentamethylbenzophenone
2-hydroxy-5-octylbenzophenone
4-chloro-3′,4′-dimethylbenzophenone
4-chloro-3,4′-dimethylbenzophenone
2-chloro-2′,4′-dimethylbenzophenone
2′-bromo-4-methylbenzophenone
2-hydroxy-4-methylbenzophenone
4-hydroxy-2-methylbenzophenone
4-hydroxyethoxybenzophenone
3-hydroxy-4-methoxybenzophenone
2-hydroxy-4-methoxy-3-methylbenzophenone
4′-methoxy-2-methylbenzophenone
4-methoxy-3-methylbenzophenone 6-methoxy-3-methylbenzophenone
6-hydroxy-3-methylbenzophenone
4-methoxy-2-methylbenzophenone
4,4'-dimethoxybenzophenone
4,4'-diethoxybenzophenone
4',4'-di-isopropoxybenzophenone
2,2'-dimethoxybenzophenone
2,3-dimethoxybenzophenone
2,4'-dimethoxybenzophenone
4-methoxy-2,5-dimethylbenzophenone
4-hydroxy-2,5-dimethylbenzophenone
2-hydroxy-3,5-dimethylbenzophenone
5-hydroxy-2,4-dimethylbenzophenone
5-methoxy-2,4-dimethylbenzophenone
5-ethoxy-2,4-dimethylbenzophenone
4-methoxy-3-methyl-6-isopropylbenzophenone
4-hydroxy-3-methyl-6-isopropylbenzophenone
4-hydroxy-2-methyl-5-isopropylbenzophenone
4-acetoxy-2-methyl-5-isopropylbenzophenone
4-acetoxy-3-methyl-5-isopropylbenzophenone
3-ethoxy-3',4,4'-trimethoxybenzophenone
3-ethoxy-3',4,4'-trimethoxybenzophenone
4-ethoxy-3,3',4'-trimethoxybenzophenone
4-(p-methoxyphenyl)-4'-phenylbenzophenone
4,4'-bis(p-methoxyphenoxy)benzophenone
4-(p-hydroxyphenyl)benzophenone
4-(p-methoxyphenyl)benzophenone
4-methoxy-3,5-dimethylbenzophenone
6-ethoxy-3-methylbenzophenone
3-chloro-4(2-hydroxyethoxy)benzophenone
2'-chloro-4-methoxybenzophenone
4'-chloro-4-methoxybenzophenone
3-fluoro-4-hydroxybenzophenone
5-fluoro-2-hydroxybenzophenone
3-fluoro-4-methoxybenzophenone
5-fluoro-2-methoxybenzophenone
4-fluoro-2-methylbenzophenone
4'-bromo-4-hydroxybenzophenone
4'-bromo-4-ethoxybenzophenone
3-iodo-4-methoxybenzophenone
3-iodo-4-hydroxybenzophenone
4'-iodo-4-ethoxybenzophenone
5-chloro-2-hydroxy-4-methylbenzophenone
3'-chloro-2-hydroxy-4-methylbenzophenone
3'-chloro-4-hydroxy-3-methylbenzophenone
3'-chloro-4-methoxy-3-methylbenzophenone
5'-chloro-2'-methoxy-3-methylbenzophenone
5'-iodo-2-hydroxy-3-methylbenzophenone
2'-iodo-6-hydroxy-3-methylbenzophenone
5-iodo-6-hydroxy-3-methylbenzophenone
3'-iodo-4'-methoxy-2-methylbenzophenone
3'-iodo-4'-hydroxy-2-methylbenzophenone
5'-iodo-2'-methoxy-2-methylbenzophenone
5'-iodo-2'-hydroxy-2-methylbenzophenone
4'-bromo-6-hydroxy-3-methylbenzophenone
2'-bromo-6-hydroxy-3-methylbenzophenone
2'-bromo-6-methoxy-3-methylbenzophenone
2-chloro-2'-bromo-4-hydroxybenzophenone
3,5-dibromo-4-hydroxybenzophenone
3,5-dibromo-4-ethoxybenzophenone
3,5-di-iodo-4-hydroxybenzophenone
3,5-dichloro-2,2',4,6'-tetramethoxy-4'-methylbenzophenone
3,3'-difluoro-4,4'-dihydroxybenzophenone
3,3'-difluoro-4,4'-dimethoxybenzophenone
3,3'-difluoro-4,4'-diethoxybenzophenone
3,3'-dibromo-5,5'-difluoro-4,4'-dihydroxybenzophenone
4-tertiarybutyl-2'-isopropenyl-2,3,5,6-tetramethylbenzophenone
2,2'-dihydroxy-4,4'-dipropoxybenzophenone
2,5-dimethoxy-3,4-dimethylbenzophenone
4,4'-dimethoxy-3,3'-dimethylbenzophenone
2,6-dimethoxy-2'-methylbenzophenone
2,6-dimethoxy-3'-methylbenzophenone
3,3'-diethoxy-4,4'-dimethoxybenzophenone
3,3',4,4',5,5'-hexamethoxybenzophenone
2,2'-dihydroxy-4,4'-bis(octyloxy)benzophenone
2,2'-dihydroxy-4,4'-bis(hexyloxy)benzophenone
3,3'-dimethoxy-4,4'-bis(benzyloxy)benzophenone
2'-hydroxyacetophenone (2-hydroxyacetophenone)
4'-hydroxyacetophenone (4-hydroxyacetophenone)
4'-methoxyacetophenone
4'-ethoxyacetophenone
4'-n-propoxyacetophenone
2'-alloxy-5'-bromoacetophenone
2-bromo-4'-methoxyacetophenone
2'-allyloxybutyrophenone
4'-butoxy-2'-methylbutyrophenone
3'-bromo-4'-methoxybutyrophenone
3'-chloro-4'-ethoxybutyrophenone
2',5'-dimethyl-4'-propoxybutyrophenone
4'-ethoxy-3'-methylbutyrophenone
4'-ethyl-2'-hydroxy-6'-methylbutyrophenone
2'-isopentyloxy-5'-methylbutyrophenone
2'-methyl-4'-propoxybutyrophenone
4'-methoxy-3'-phenylbutyrophenone
2'-hydroxy-5'-methyloctanophenone
4-n-dodecyloxyacetophenone
4-benzyloxyacetophenone
4'-phenoxyacetophenone
2',3'-dimethyl-4'-hydroxyacetophenone
3'-bromo-4'-hydroxyacetophenone
3'-bromo-5'-fluoro-2'-hydroxyacetophenone
3'-allyl-4'-hydroxyacetophenone
3'-allyl-2'-hydroxyacetophenone
3'-allyl-2'-hydroxy-5'-methylacetophenone
5'-ethyl-2'-hydroxybutyrophenone
4'-hydroxypentanophenone
4'-hydroxyhexanophenone
5'-methyl-2'-(p-tolyloxy)acetophenone
4'-(p-hydroxyphenoxy)acetophenone
2'-hydroxy-4'-pentadecylacetophenone
2'-hydroxy-3'-methylacetophenone
2'-hydroxy-4'-methylacetophenone
2'-hydroxy-5'-methylacetophenone
3'-hydroxy-4',5'-dimethylacetophenone
3',5'-dibromo-4'-hydroxymethylbutyrophenone
2'-hydroxycrotonophenone
4'-hydroxycrotonophenone
4'-ethoxy-α-methylcrotonophenone
2'-hydroxypentenophenone
5'-chloro-2'-hydroxycrotonophenone
4'-methoxy-3-methyl-2-pentenophenone
4'-methoxy-2-hexenophenone
3'-tert.butyl-3'-chloro-2'-hydroxypentenophenone
2'-hydroxy-4',5'-dimethylpentenophenone
2'-methoxy-4-heptenophenone
2'-methoxy-6-heptenophenone
2'-methoxy-2-octenophenone
3'-methyl-4'-methoxy acetophenone
3'-ethyl-4'-methoxy acetophenone
3'-butyl-4'-methoxy acetophenone
3'-allyl-4'-methoxy acetophenone
4'-butoxy-3'-methyl acetophenone
4'-isopentyloxy-3'-methyl acetophenone
3'-hexyl-4'-methoxy acetophenone
3'-lauryl-4'-methoxy acetophenone
3'-methyl-4'-ethoxy acetophenone
3'-butyl-4'-ethoxy acetophenone
3'-iso-octyl-4'-ethoxy acetophenone
3'-decyl-4'-ethoxy acetophenone
3'-methyl-4'-n-propoxy acetophenone
3'-iso-amyl-4'-n-propoxy acetophenone
3'-stearyl-4'-n-propoxy acetophenone
3'-methyl-4'-phenoxy acetophenone
3'-methyl-4'-benzyloxy acetophenone
3'-methyl-4'-allyloxy acetophenone
3'-methyl-4'-methoxy-2-pentenophenone
3'-ethyl-4'-methoxy-propiophenone
3'-n-butyl-4'-methoxy-propiophenone 3'-n-butyl-4'-n-propoxy-propiophenone
3'-methyl-4'-methoxy-butyrophenone
3'-methyl-4'-allyloxy-butyrophenone
3'-methyl-4'-phenoxy-butyrophenone
3'-ethyl-4'-(p-chlorobenzyloxy)-butyrophenone
3'-pentadecyl-4'-methoxy-butyrophenone
4'-methoxy-3'-methyl-α-phenyl acetophenone
4'-butoxy-3'-methyl-butyrophenone
4'-isopentyloxy-3'-methyl-butyrophenone
ω-methoxy acetophenone
ω-ethoxy acetophenone
ω-cyclohexyloxy acetophenone
ω-phenoxy acetophenone
2-phenacyloxy benzyl bromide
2-phenacyloxy benzyl alcohol
ω-acetoxy acetophenone
4-chloro-ω-hydroxy acetophenone
4-bromo-ω-hydroxy acetophenone
4-bromo-ω-acetoxy acetophenone
β-isopropyl-acrylic acid (4-bromophenacyl ester)
4-iodo-ω-hydroxy acetophenone
4-iodo-phenacylcaprylate
ω-butyl mercapto-acetophenone
α-bromo-6-methylmercapto-3-methyl propiophenone
α,β-dibromo-6-acetoxy-3-methyl butyrophenone
α-acetoxy-2,5-dimethyl isobutyrophenone
2-hydroxy-1-benzoyl-propene-(1)
2-ethoxy-1-benzoyl-propene-(1)
bis(3,5-dimethyl-4-propyl-3-pyrryl) ketone
bis(5-bromo-4-ethyl-3-methyl-2-pyrryl) ketone
bis(3-ethyl-5-methyl-2-pyrryl) ketone
bis(4-ethyl-3-methyl-2-pyrryl) ketone
bis(5-ethyl-3-methyl-2-pyrryl) ketone
bis(5-bromo-2-thienyl) ketone
bis(5-methyl-2-thienyl) ketone
bis(5-chloro-2-thienyl) ketone
5-chloro-2-thienyl-5-bromo-2-thienyl ketone
(5-chloro-2-thienyl)-2-thienyl ketone
5-methyl-2-thienyl-5-bromo-2-thienyl ketone
5-methyl-2-thienyl-5-chloro-2-thienyl ketone
2,5-dimethyl-3-thienyl-5-chloro-2-thienyl ketone
5-chloro-2-thienyl-5-ethyl-2-thienyl ketone
2,5-dimethyl-3-thienyl-2-thienyl ketone
bis(5-methyl-2-thienyl) ketone
bis(2,5-dimethyl-3-thienyl) ketone
2-furyl-3-indolyl ketone
2-furyl-2-thienyl ketone
2-furyl ketone
3-thienyl ketone
2-furyl-2-methyl-3-indolyl ketone
2-furyl-1-methyl-3-indolyl ketone
3-indolyl-2-thienyl ketone
2-pyrryl-2-thienyl ketone
2,5-dimethyl-3-thienyl-2-thienyl ketone
2,5-dimethyl-3-thienyl-2-furyl ketone
2-pyridyl-4-pyridyl ketone
3-pyridyl-4-pyridyl ketone
5-chloro-2-thienyl-2-furyl ketone
5-chloro-2-thienyl-3-furyl ketone
3-indolyl-5-methyl-2-thienyl ketone
3-indolyl-2-pyridyl ketone
2-thienyl-3-thienyl ketone
2-acetamido-4-phenyl-5-thiazolyl phenyl ketone
2-benzofuryl phenyl ketone
2-benzothiazolyl phenyl ketone
5-bromo-2-thienyl phenyl ketone
6-(benzyloxy)-3-methyl-2-benzofuryl phenyl ketone
5-bromo-2-benzofuryl-p-bromophenyl ketone
5,7-dibromo-2-benzofuryl phenyl ketone
4,5-dibromo-2-thienyl phenyl ketone
4,5-diiodo-2-pyrryl phenyl ketone
4,5-diiodo-2-thienyl phenyl ketone
3,4-dimethoxyphenyl-2-furyl ketone
1,2-dimethyl-3-phenyl-3-pyrrolidyl phenyl ketone
3,5-dimethyl-4-isoxazolyl pentamethyl phenyl ketone
2,6-dimethyl-3-pyridyl phenyl ketone
4,5-dimethyl-3-pyrryl phenyl ketone
4,5-dimethyl-2-thiazolyl phenyl ketone
2,5-dimethyl-3-thienyl phenyl ketone
2,5-dimethyl-3-thienyl p-tolyl ketone
2,5-dimethyl-3-thienyl p-ethylphenyl ketone
2,3-dimenthyl-1-naphthyl-2-thienyl ketone
2,5-diphenyl-3-furyl phenyl ketone
4,5-diphenyl-3-isoxazolyl phenyl ketone
1,5-diphenyl-3-pyrryl phenyl ketone
2-furyl-o-tolyl ketone
2-furyl-p-tolyl ketone
5-iodo-2-thienyl phenyl ketone
5-methyl-3-isoxazolyl phenyl ketone
2-methyl-3-indolyl phenyl ketone
2-methyl-3-indolyl p-tolyl ketone
2-methyl-1-naphthyl-2-thienyl ketone
2-methyl-5-benzoxazolyl phenyl ketone
5-methyl-2-thiazolyl phenyl ketone
5-methyl-3-phenyl-4-isoxazolyl phenyl ketone
5-methyl-1-phenyl-1,2,3-triazol-4-yl phenyl ketone
2-methyl-3-pyridyl phenyl ketone
1-naphthyl-2-pyridyl ketone
1-naphthyl-4-pyridyl ketone
1-naphthyl-3-pyridyl ketone
2-naphthyl-3-pyridyl ketone
phenyl-5-phenyl-3-furyl ketone
phenyl-5-phenyl-3-isoxazolyl ketone
phenyl-5-phenyl-3-pyrryl ketone
phenyl-5-phenyl-2-pyrryl ketone
phenyl-5-phenyl-2-thienyl ketone
phenyl-4-thiazolyl ketone
phenyl-5-thiazolyl ketone
phenyl-2-thienyl ketone
phenyl-3-pyrazolyl ketone
phenyl-2-pyridyl ketone The compositions of the present invention are applied to the skin in any dermatologically acceptable carrier. The compounds employed herein may be applied from aqueous systems in solution or in dispersed form. They may similarly be applied from oil systems and further, from oil and water systems of both oil-in-water and water-in-oil emulson types. The amount of compound to be used is not critical and may vary from as little as 0.01% by weight based on the weight of the total composition to a composition wherein the compound or mixtures of compounds herein contemplated comprise the major amount of the composition, i.e., about 50%, up to 100%. Since for most purposes it is not practical to employ the compounds per se (i.e., 100% active), the use in dermatological bases is preferred. The following examples will serve to illustrate the present invention without being deemed limitative thereof. Parts are by weight unless otherwise indicated.

EXAMPLE 1

To the following hand lotion there is added 0.5 part of β,β-diphenyl-α-cyanoacrylic acid isooctyl ester (protector)

*Hand lotion*

(A)

| | Parts |
|---|---|
| Stearic acid | 5.0 |
| Cetyl alcohol | 0.5 |
| Stearyl alcohol | 0.5 |
| Isopropyl myristate | 1.5 |

(B)

| | |
|---|---|
| Triethanolamine | 2.0 |
| Propylene glycol | 4.0 |
| Polyvinyl pyrrolidone (K=30) | 0.5 |
| Water | 85.0 |

The protector is first added to part A and then part A is stirred into part B at 80° C.

The lotion is rubbed into the hands and exposed to a General Electric sunlamp for 20 minutes. There is only slight evidence of reddening after continued observation for 12 hours. In the absence of the protector, severe burning occurs.

EXAMPLE 2

An aerosol preparation of the formulation of Example 1 is made as follows: 92 parts formulation of Example 1 is charged with 8 parts Generton 12/114 (57/43) in a conventional aerosol container. This composition is applied to the hand and affords similar protection as in Example 1.

EXAMPLE 3

0.2 part of the protector of Example 1 is added to the following composition charged in an aerosol container:

| | Parts |
|---|---|
| Polyvinyl pyrrolidone | 0.5 |
| Ethanol (85%) | 70.0 |
| Perfume | 0.5 |
| Propellant 12 | 30.0 |
| Propellant 114 | 10.0 |

This composition makes an excellent after-shave lotion and when applied to the face, gives excellent protection against sunburn and the weathering effects of sunlight.

EXAMPLE 4

2 parts of the compound used in Example 1 (protector) dissolved in 98 parts mineral oil is an excellent oil base suntan lotion.

EXAMPLE 5

A condensation product of 15 moles of ethylene oxide with the hydroxyethyl ester of $\beta,\beta$-diphenyl-$\alpha$-cyanoacrylic acid is prepared as a 5% solution in water. This is applied to the skin and affords excellent protection from actinic radiations.

EXAMPLE 6

The following compounds are added to mineral oil (100 parts) in the indicated amounts:

| | Parts |
|---|---|
| (a) $\alpha$-Cyano-$\beta,\beta$-diphenyl acrylic acid ethyl ester | 0.2 |
| (b) $\alpha$-Cyano-$\beta,\beta$-diphenyl acrylic acid lauryl ester | 0.2 |
| (c) $\alpha$-Cyano-$\beta,\beta$-diphenyl acrylic acid methoxyethyl ester | 0.5 |
| (d) $\alpha$-Cyano-$\beta,\beta$-diphenyl acrylic acid tetrahydrofurfuryl ester | 0.3 |
| (e) $\alpha$-Cyano-$\beta,\beta$-diphenyl acrylic acid phenyl ester | 0.3 |
| (f) $\alpha$-Cyano-$\beta,\beta$-diphenyl acrylic acid tolyl ester | 0.3 |
| (g) $\alpha$-Cyano-$\beta,\beta$-diphenyl acrylic acid anisyl ester | 0.3 |
| (h) $\alpha$-Cyano-$\beta,\beta$-bis(p-hydroxyphenyl) acrylic acid ethyl ester | 0.4 |
| (i) $\alpha$-Cyano-$\beta$-phenyl-$\beta$-4-chlorophenyl acrylic acid ethyl ester | 0.4 |
| (j) $\alpha$-Cyano-$\beta,\beta$-diphenyl acrylamide | 0.5 |
| (k) $\alpha$-Cyano-$\beta$-phenyl-$\beta$-(3,4-dimethyl phenyl) acrylic acid ethyl ester | 0.5 |
| (l) $\alpha$-Cyano-$\beta,\beta$-diphenyl-N,N-dimethyl acrylamide | 0.5 |
| (m) $\alpha$-Cyano-$\beta,\beta$-diphenyl-arcylic pyrrolidide | 0.5 |
| (n) $\beta,\beta$-Diphenyl methylene malononitrile | 0.4 |
| (o) $\beta$-Phenyl-$\beta$-thienyl methylene malononitrile | 0.6 |
| (p) $\beta$-Phenyl-$\beta$-furyl methylene malononitrile | 0.6 |
| (q) $\beta$-Methyl-$\beta$-thienyl methylene malononitrile | 0.6 |
| (r) $\beta$-Methyl-$\beta$-phenyl methylene malononitrile | 0.6 |
| (s) $\beta,\beta$-Dithienyl methylene malononitrile | 0.6 |
| (t) $\alpha$-Cyano-$\beta$-phenyl-$\beta$-thienyl acrylic acid ethyl ester | 0.5 |
| (u) $\alpha$-Cyano-$\beta$-methyl-$\beta$-thienyl acrylic acid ethyl ester | 0.5 |
| (v) $\alpha$-Cyano-$\beta$-furyl-$\beta$-thienyl acrylic acid ethyl ester | 0.5 |
| (w) $\alpha$-Cyano-$\beta$-isooctyl-$\beta$-thienyl acrylic acid ethyl ester | 0.5 |
| (x) $\alpha$-Cyano-$\alpha$-isooctyl-$\beta$-phenyl acrylic acid ethyl ester | 0.5 |
| (y) $\alpha$-Cyano-$\beta$-cyclohexyl-$\beta$-phenyl acrylic acid ethyl ester | 0.5 |
| (z) $\alpha$-Cyano-$\beta$-propenyl-$\beta$-phenyl acrylic acid ethyl ester | 0.5 |

EXAMPLE 7

A 2% aqueous solution of $\alpha$-cyano $\beta$-phenyl-$\beta$-(4-sulfophenyl) acrylic acid ethyl ester (solution slightly acid to a pH of 4 with acetic acid) is applied to the skin. The compound at this pH is substantive to the skin and dyes it whereby excellent protection is afforded without resort to any film-former to bind or hold the product on the skin.

EXAMPLE 8

Example 7 is repeated using the following water dispersible, skin-substantive compounds:

(A) Ethyl $\alpha$-cyano-$\beta,\beta$-bis(4-sulfophenyl) acrylate
(B) $\beta,\beta$-bis(4-sulfophenyl) methylene malononitrile
(C) $\beta$-(4-sulfophenyl)-$\beta$-thienyl methylene malononitrile
(D) Ethyl-$\alpha$-cyano-$\beta$-(4-sulfophenyl)-$\beta$-thienyl acrylate
(E) $\alpha$-Cyano-$\beta,\beta$-diphenyl acrylic acid
(F) $\alpha$-Cyano-$\beta$-(4-sulfophenyl)-$\beta$-phenyl acrylic acid
(G) $\alpha$-Cyano-$\beta$-phenyl-$\beta$-thienyl acrylic acid
(H) $\alpha$-Cyano-$\beta$-(4-sulfophenyl)-$\beta$-thienyl acrylic acid
(I) $\beta$-(4-carboxyphenyl)-$\beta$-phenyl methylene malononitrile
(J) $\beta$-(4-carboxyphenyl)-$\beta$-thienyl methylene malononitrile
(K) $\beta,\beta$-Bis(4-carboxyphenyl)methylene malononitrile Similar results are obtained as in Example 7.

EXAMPLE 9

The compounds of Examples 7 and 8 are incorporated into the following cream at a 2% concentration:

| | Parts |
|---|---|
| Petrolatum | 10 |
| Mineral oil | 5 |
| Water | 60 |
| Glyceryl monostearate | 7 |
| Beeswax | 3 |
| Polyvinyl pyrrolidone (K=30) | 1 |

EXAMPLE 10

To the following face powder there is added 1% of the compounds of Examples 1 and 6:

| | Parts |
|---|---|
| Titanium dioxide | 5 |
| Glyceryl monostearate | 5 |
| Allyl alcohol | 3 |
| Stearic acid | 3 |
| Liquid paraffin | 3 |
| Glycerin | 4 |
| Water | 77 |

As pointed out above, mixtures of compounds may be used as well as single compounds. The former is indicated where a high degree of protection is desired over a wide band of radiation. In such cases it is desirable to blend two or more compounds having high K values in the far and near ultra-violet light, e.g., one having a K max. at 300 m$\mu$, one at 320 m$\mu$, and one at 340 m$\mu$. For persons having a supersensitivity to ultra-violet light and particularly sunlight, such blends are preferred, and afford outstanding protection. For persons desiring a tanning action, a compound absorbing with a maximum at about 310 to 330 m$\mu$ would be indicated. Thus the compound of Example 1 will permit tanning while isooctyl-$\alpha$-cyano-$\beta$-phenyl-$\beta$-thienyl acrylate will prevent tanning in concentrations of above about 5% in a suitable carrier. The compound of Example 6(o) will prevent tanning in even smaller concentrations, its K max. (in methanol)=79.4 at 354 m$\mu$.

Other variations in and modifications of the described processes which will be obvious to those skilled in the art can be made in this invention without departing from the scope or spirit thereof.

We claim:
1. In a method for protecting skin against actinic radiations, the improvement which comprises applying to the skin a composition comprising
(I) a compound having the formula

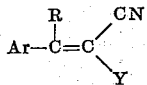

wherein
(1) R is a radical selected from the group consisting of hydrogen, alkyl, aryl, alkenyl and hetero;
(2) Y is selected from the group consisting of CN and

wherein:
X is selected from the group consisting of $OR_3$ and

$R_1$, $R_2$ and $R_3$ are independently any R radical; and
(3) Ar is a radical selected from the group consisting of aromatic carbocyclic nuclei and heterocyclic nuclei having at least one pair of conjugated double bonds, and
(II) a dermatologically acceptable carrier;
(III) said compound I being devoid of nitro groups and aromatic nuclear substituted amino groups.

2. In a method as defined in claim 1 wherein the compound I is isooctyl-α-cyano-β,β-diphenylacrylate.
3. A method as defined in claim 1 wherein the carrier is water.
4. A method as defined in claim 1 wherein the carrier is mineral oil.
5. A method as defined in claim 1 wherein the carrier is a water-in-oil emulsion.
6. A method as defined in claim 1 wherein the carrier is an oil-in-water emulsion.
7. A method as defined in claim 1 wherein the carrier is a fluorinated hydrocarbon propellant.
8. A method as defined in claim 1 wherein Compound I is α-cyano-β-phenyl-β-(4-sulfophenyl)-acrylic acid ethyl ester.
9. A method as defined in claim 1 wherein Compound I is β-phenyl-β-thienyl methylene malononitrile.
10. A method as defined in claim 1 wherein Compound I is isooctyl isocyano-β-phenyl-β-thienyl acrylate.

References Cited by the Examiner

UNITED STATES PATENTS

| | | | |
|---|---|---|---|
| 2,853,423 | 9/1958 | La Via | 167—90 |
| 2,876,210 | 3/1959 | Wynn | 260—49 |
| 3,052,636 | 9/1962 | Strobel | 167—90 |
| 3,069,456 | 12/1962 | Strobel | 260—465 |
| 3,074,971 | 1/1963 | Strobel | 260—465 |
| 3,079,366 | 2/1963 | Boyle | 260—465 |
| 3,081,280 | 3/1963 | Carlson | 260—465 |
| 3,085,097 | 4/1963 | Strobel | 260—465 |
| 3,149,148 | 9/1964 | Kladko | 260—465 |

FOREIGN PATENTS 216,501  8/1961  Austria.

JULIAN S. LEVITT, *Primary Examiner.*

A. P. FAGELSON, M. J. COHEN, *Assistant Examiners.*